(12) United States Patent
Patel et al.

(10) Patent No.: US 8,854,200 B2
(45) Date of Patent: Oct. 7, 2014

(54) TPMS TIRE FILL DETECTION MODE TO ENSURE ACCURATE TIRE FILLING

(75) Inventors: Dilip B. Patel, Novi, MI (US); Steven Yellin Schondorf, Dearborn, MI (US); Greg Swadling, Milford, MI (US); Mohsen Katiba, Dearborn, MI (US); Thomas Michael McQuade, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 13/465,056

(22) Filed: May 7, 2012

(65) Prior Publication Data

US 2013/0293371 A1    Nov. 7, 2013

(51) Int. Cl.
*G08B 21/00*    (2006.01)
(52) U.S. Cl.
USPC .......................................... 340/442; 73/146.5
(58) Field of Classification Search
CPC ................................ B60C 23/00; B60C 23/02
USPC ........................ 340/442–448; 73/146–146.8
See application file for complete search history.

(56) References Cited

U.S. PATENT DOCUMENTS

| | | | |
|---|---|---|---|
| 4,311,985 A | 1/1982 | Gee et al. | |
| 5,109,213 A | 4/1992 | Williams | |
| 5,699,041 A | 12/1997 | Ballyns | |
| 6,486,773 B1 | 11/2002 | Bailie et al. | |
| 6,545,599 B2 * | 4/2003 | Derbyshire et al. | 340/442 |
| 6,612,165 B2 | 9/2003 | Juzswik et al. | |
| 6,750,762 B1 | 6/2004 | Porter et al. | |
| 7,218,209 B2 | 5/2007 | Utter et al. | |
| 7,482,913 B2 | 1/2009 | Kusunoki et al. | |
| 7,784,337 B2 | 8/2010 | Kim | |

\* cited by examiner

*Primary Examiner* — Jeffery Hofsass
(74) *Attorney, Agent, or Firm* — Shook Hardy & Bacon

(57) ABSTRACT

A method and system for managing tire pressure in a vehicle are disclosed. The system is a tire pressure monitoring system associated with the tire pressure sensors. The method includes the general steps of informing the operator that air pressure in a tire is below a desired level, causing the sensor to undertake a rapid sampling of pressure of the tire during an interim state while the vehicle is being driven, advising the operator to manually add pressure to the tire in discrete increments of, for example, between 5 and 10 seconds, causing the sensor to undertake a rapid sampling of tire pressure while air is being manually added to the tire, and causing the sensor to transmit tire air pressure data until the operator stops adding air. The method may also include the step of providing the operator with feedback when a predetermined tire air pressure is reached.

20 Claims, 3 Drawing Sheets

TPMS TIRE FILL DETECTION MODE TO ENSURE ACCURATE TIRE FILLING

TECHNICAL FIELD

The disclosed invention relates generally to the management of tire pressures on vehicles. More particularly, the disclosed invention relates to a method and system for notifying the vehicle operator that tire pressure is incorrect and assisting the operator in the proper inflation of the tires.

BACKGROUND OF THE INVENTION

Many types of pressure sensing systems for monitoring the pressure within the pneumatic tires of a vehicle have been proposed. In general, such systems, commonly known as tire pressure monitoring systems (TPMS), include tire pressure sensors located at each tire either as part of the valve stem or in other locations, such as in the tire wall or the tread.

Each of the sensors generates a pressure signal in the form of an electromagnetic (EM) signal. The electromagnetic signal is then transmitted by the sensor to a central receiver. The pressure signal generated corresponds to the pressure within the tire. When the tire pressure drops below a predetermined pressure, an indicator is used to signal the vehicle operator of the low pressure.

Properly inflated tires are important for achieving optimal fuel economy and vehicle handling. When the tire pressure monitoring system detects a low tire pressure situation, the vehicle operator is informed by the TPMS. Such problems are corrected either by replacing the low tire with a spare tire or filling the low tire to increase the pressure.

Once advised that the tire pressure is below the desired pressure, the vehicle operator takes steps to inflate the low tire to the proper pressure and, in so doing, either does not use a gauge at all, relying solely on the appearance of the tire, or uses a hand-held tire pressure gauge. The hand-held gauges are generally of the digital type, the analog dial type, or of the long, manual pencil type. While the quality of these gauges varies widely, it is very typical for a vehicle operator to rely on inexpensive and often inaccurate tire pressure gauge for the filling process. But cost alone is not a factor in determining accuracy of a gauge.

In any event almost every hand-held gauge regardless of price is less accurate than the tire pressure sensors provided as part of the TPMS. Accordingly, an obvious solution to the problem of inaccurate hand-held tire pressure gauges would be to have the TPMS sensors themselves transmit pressure values during the tire filling process. However, that solution creates several problems. An example of one such problem is the resulting reduced battery life in the TPMS sensor due to the increased number of transmissions during the lifetime of the sensor.

Accordingly, as in so many areas of vehicle technology, there is room in the art of tire pressure monitoring systems for vehicles for an alternative approach to tire pressure monitoring during manual inflation.

SUMMARY OF THE INVENTION

The disclosed invention provides a method and system for managing tire pressure in a vehicle. The method uses a tire pressure monitoring system (TPMS) operatively associated with the tire pressure sensors. The tire pressure monitoring system includes a central processing unit linked to the tire pressure sensors. The central processing unit includes different operating modes, including a tire fill detection mode.

The method includes the general steps of informing the operator that air pressure in a tire is below a desired level, causing the sensor to undertake a rapid sampling of pressure of the tire during an interim state while the vehicle is being driven, advising the operator to manually add pressure to the tire in discrete increments of, for example, between 5 and 10 seconds, causing the sensor to undertake a rapid sampling of tire pressure while air is being manually added to the tire, and causing the sensor to transmit tire air pressure data until the operator stops adding air. The method may also include the step of providing the operator with feedback when a predetermined tire air pressure is reached. The feedback may be in the form of an audio or visual alert for the operator.

In one variation there is an additional step of causing the sensor to transmit the last sampled value when the sensor detects no more air is being added. This step occurs while the system is in the said tire fill detection mode.

In another variation there is an additional step of causing the sensor to transmit data when the sensor senses a pressure level that is above a predetermined threshold. This step occurs while the system is in the tire fill detection mode.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
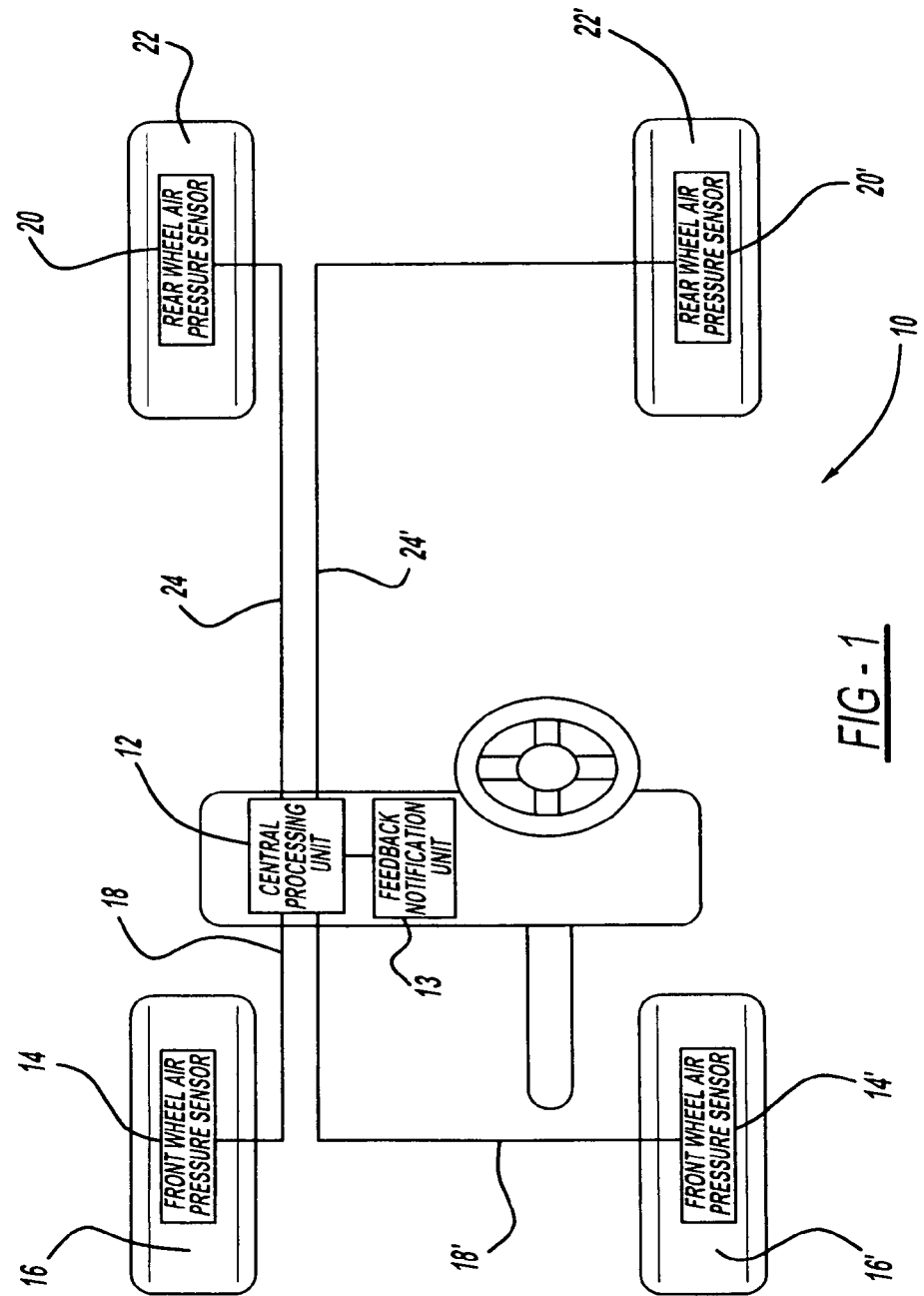
FIG. 1 illustrates a diagrammatic view of a TPMS fill-detection system with vehicle tires according to the disclosed invention.

In the following figures, the same reference numerals will be used to refer to the same components. In the following description, various operating parameters and components are described for different constructed embodiments. These specific parameters and components are included as suggested examples and are not meant to be limiting.

Referring to FIG. 1, a diagrammatic view of a TPMS fill-detection system with vehicle tires according to the disclosed invention is illustrated. The system, generally illustrated as 10, includes a central processing unit 12. The central processing unit 12 includes different operating modes, including a tire fill detection mode.

The central processing unit 12 is associated with a feedback notification unit 13 and tire air pressure sensors as is known in the art. Particularly, a front wheel air pressure sensor 14 is operatively associated with a front tire 16. The front wheel air pressure sensor 14 is operatively associated with the central processing unit 12 by a front wheel air pressure sensor communication line 18. A front wheel air pressure sensor 14' is operatively associated with a front tire 16'. The front wheel air pressure sensor 14' is operatively associated with the central processing unit 12 by a front wheel air pressure sensor communication line 18'.

In addition, a rear wheel air pressure sensor 20 is operatively associated with a rear tire 22. The rear wheel air pressure sensor 20 is operatively associated with the central processing unit 12 by a rear wheel air pressure sensor communication line 24. A rear wheel air pressure sensor 20' is operatively associated with a rear tire 22'. The rear wheel air pressure sensor 20' is operatively associated with the central processing unit 12 by a rear wheel air pressure sensor communication line 24'.

It is to be understood that the TPMS fill-detection system illustrated in FIG. 1 is not intended as being limiting but is rather provided for illustrative purposes only.

Figure 2:
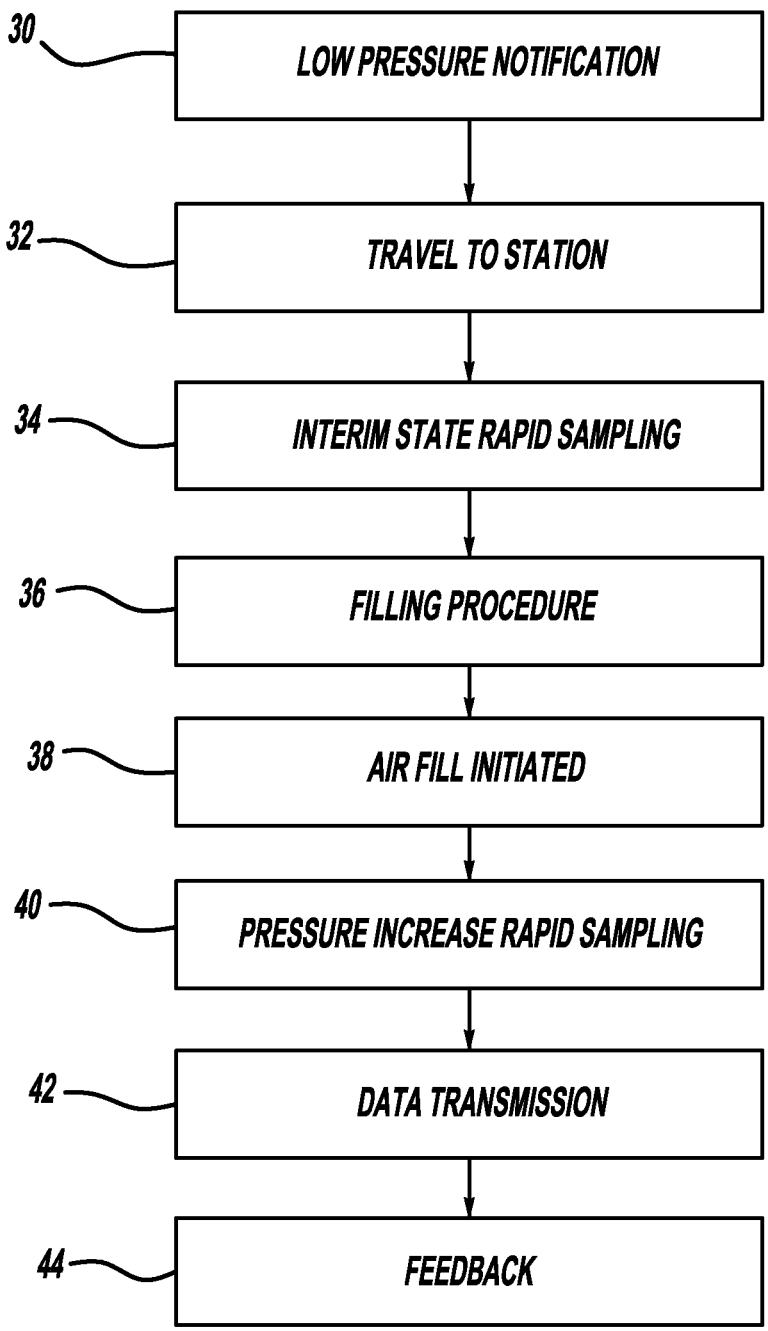
FIG. 2 is a flow chart illustrating determining a tire pressure status as it relates to inflation according to a first embodiment of the disclosed invention.

FIG. 2 is a flow chart illustrating determining a tire pressure status as it relates to inflation according to the disclosed invention.

In step 30, the operator is made aware by the tire pressure monitoring system (TPMS) 10 that the air pressure in one or more tires 16, 16', 22, 22' is below the required level. This notification may be made by various methods as is known in the art, including visual or audio indicators. In step 32, the operator proceeds to an air filling station. Once the vehicle is driven to the air filling station the wheel air pressure sensors 14, 14', 20, 20' enter a rapid sampling mode during the interim state. This is at step 34. At step 36, the operator is advised by the system 10 to add pressure to the low tire in small increments of time. Preferably but not absolutely the increments would be between about 5 and 10 seconds.

In step 38, the operator begins to fill the low tire to thereby increase the pressure therein. The central processing unit 12 enters its tire fill detection mode. At this time, the rapid sampling enables the associated one of wheel air pressure sensors 14, 14', 20, 20' to detect an increase in tire pressure. This is step 40.

At step 42, the engaged wheel air pressure sensor 14, 14', 20, 20' transmits pressure data to the central processing unit 12. However, the transmission of such data is delayed until either such time as the operator interrupts the addition of air or when the tire pressure is determined by the central processing unit 12 to be above a certain predetermined threshold (such as 35 psi or more), whichever occurs first. If the recommended tire pressure (placard pressure) is not stored in the vehicle electronics, the customer could be provided an opportunity to enter the desired fill pressure into the vehicle's HMI (Human Machine Interface) display or message center before starting the tire fill operation.

In the first possibility, where first the customer has finished adding air, upon detection that no more air is being added the engaged wheel air pressure sensor 14, 14', 20, 20' would transmit the last sampled value to the central processing unit 12 when it detects that no more air is being added, thereby ensuring an accurate pressure value reading with the latest pressure value. In the second possibility, where first the pressure has reached a predetermined level, that level is determined and entered into the central processing unit 12 at an earlier time.

Once it is determined by the latest information provided to the central processing unit 12 that enough air has been added, then the operator receives feedback from the feedback notification unit 13 at step 44. The feedback from the feedback notification unit 13 may be either an audio alert such as the honk of the vehicle horn or may be visual alert such as an indication on the vehicle instrument cluster.

Figure 3:
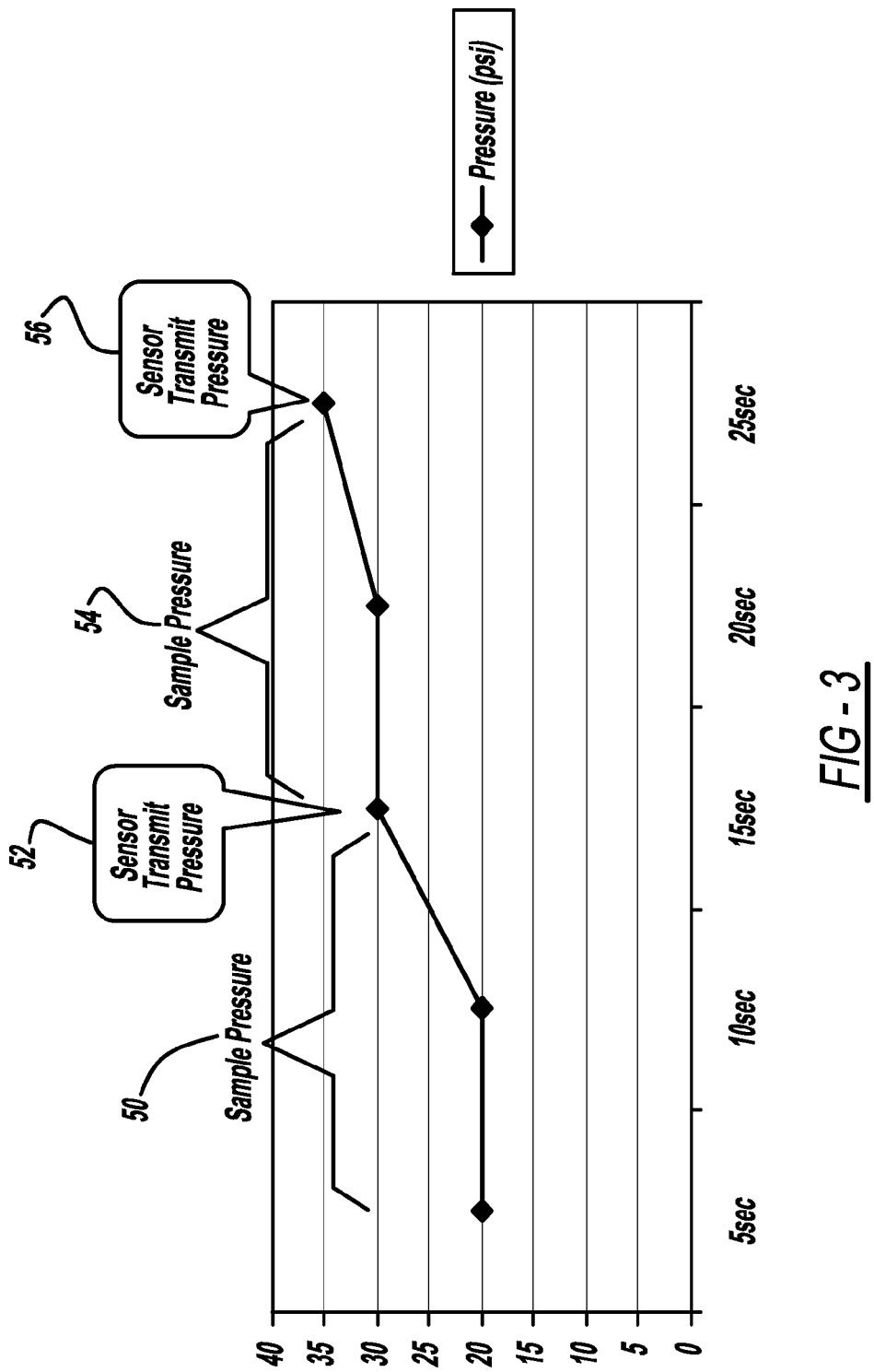
FIG. 3 is a graph illustrating sampling of tire pressure in psi along the Y-axis and second intervals along the X-axis.

An example of rapid sampling according to the disclosed invention is illustrated in FIG. 3. As set forth in the graph, tire pressure in psi is along the Y-axis and time intervals in seconds are along the X-axis. As illustrated, a first sample pressure 50 is taken beginning at 20 psi and ending at a first sensor transmit pressure 52 of 30 psi. The time increment for the first sample pressure 50 is about 10 seconds.

A second sample pressure 54 is then taken beginning at 30 psi and ending at a second sensor transmit pressure 56 of 35 psi, the target or desired value for the tire. The time increment for the second sample pressure 54 is also about 10 seconds.

It is to be understood that the illustrated sample pressures and time increments set forth in FIG. 3 are intended as being illustrative and not limiting.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method for managing tire pressure in a vehicle, the method comprising:
   forming a tire pressure monitoring system having a tire fill detection mode, said system including an air pressure sensor operatively associated with a tire;
   informing the operator that air pressure in said tire is below a desired level;
   causing said sensor to undertake a rapid sampling of pressure of said tire during an interim state while the vehicle is being driven;
   advising the operator to manually add pressure to said tire in discrete increments;
   causing said sensor to undertake a rapid sampling of tire pressure while air is being manually added to said tire; and
   causing said sensor to transmit tire air pressure data until the operator stops adding air.

2. The method for managing tire pressure of claim 1 including the step of providing the operator with feedback when a predetermined tire air pressure is reached.

3. The method for managing tire pressure of claim 2 including the step of causing said sensor to transmit the last sampled value when said sensor detects no more air is being added.

4. The method for managing tire pressure of claim 3 wherein said step of causing said sensor to transmit the last sampled value when said sensor detects no more air is being added occurs while said system is in said tire fill detection mode.

5. The method for managing tire pressure of claim 4 wherein said discrete increments are between 5 and 10 seconds.

6. The method for managing tire pressure of claim 4 wherein said feedback is selected from the group consisting of an audio alert and a visual alert.

7. The method for managing tire pressure of claim 1 including the step of causing said sensor to transmit data when said sensor senses a pressure level that is above a predetermined threshold.

8. The method for managing tire pressure of claim 7 wherein said step of causing said sensor to transmit data when said sensor senses a pressure level that is above a predetermined threshold occurs while said system is in said tire fill detection mode.

9. The method for managing tire pressure of claim 8 wherein said discrete increments are between 5 and 10 seconds.

10. The method for managing tire pressure of claim 8 wherein said feedback is selected from the group consisting of an audio alert and a visual alert.

11. A method for managing tire pressure in a vehicle, the method comprising:
   forming a tire pressure monitoring system, said system including an air pressure sensor operatively associated with a tire;
   informing the operator that air pressure in said tire is below a desired level;
   advising the operator to manually add pressure to said tire in discrete increments;
   undertaking a rapid sampling of tire pressure while air is being manually added to said tire; and
   transmitting tire air pressure data until the operator stops adding air.

12. The method for managing tire pressure in a vehicle of claim 11, including the step of undertaking a rapid sampling of pressure of said tire while the vehicle is being driven.

13. The method for managing tire pressure in a vehicle of claim 11, including the step of providing the operator with feedback when a predetermined tire air pressure is reached.

14. The method for managing tire pressure of claim 11 including the step of causing said sensor to transmit the last sampled value when said sensor detects no more air is being added.

15. The method for managing tire pressure of claim 14 wherein said step of causing said sensor to transmit the last sampled value when said sensor detects no more air is being added occurs while said system is in said tire fill detection mode.

16. The method for managing tire pressure of claim 11 including the step of causing said sensor to transmit data when said sensor senses a pressure level that is above a predetermined threshold.

17. The method for managing tire pressure of claim 16 wherein said step of causing said sensor to transmit data when said sensor senses a pressure level that is above a predetermined threshold occurs while said system is in said tire fill detection mode.

18. A method for managing vehicle tire pressure comprising:
   forming a tire pressure monitoring system that includes a tire air pressure sensor;
   informing the operator that tire air pressure is below a desired level;
   advising the operator to manually add pressure to said tire in discrete increments;
   undertaking a rapid sampling of tire pressure while air is being manually added to said tire; and
   transmitting tire air pressure data until the operator stops adding air.

19. The method for managing vehicle tire pressure of claim 18, including the step of causing said sensor to transmit the last sampled value when said sensor detects no more air is being added.

20. The method for managing vehicle tire pressure of claim 18, including the step of causing said sensor to transmit data when said sensor senses a pressure level that is above a predetermined threshold.

* * * * *